(12) United States Patent
Rajamony et al.

(10) Patent No.: US 8,543,769 B2
(45) Date of Patent: Sep. 24, 2013

(54) FINE GRAINED CACHE ALLOCATION

(75) Inventors: Ramakrishnan Rajamony, Austin, TX (US); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 12/509,752

(22) Filed: Jul. 27, 2009

(65) Prior Publication Data

US 2011/0022773 A1    Jan. 27, 2011

(51) Int. Cl.
*G06F 12/00* (2006.01)
(52) U.S. Cl.
USPC ........... 711/141; 711/130; 711/133; 711/134; 711/135; 711/145
(58) Field of Classification Search
USPC .................. 711/118, 133, 145, 130, 134, 135, 711/141
See application file for complete search history.

(56) References Cited

U.S. PATENT DOCUMENTS

| | | | |
|---|---|---|---|
| 5,353,425 A * | 10/1994 | Malamy et al. ................ | 711/144 |
| 5,684,976 A | 11/1997 | Soheili-Arasi et al. | |
| 5,898,849 A * | 4/1999 | Tran ............................... | 712/203 |
| 6,122,709 A | 9/2000 | Wicki et al. | |
| 6,493,800 B1 | 12/2002 | Blumrich | |
| 6,996,676 B2 | 2/2006 | Megiddo et al. | |
| 7,415,575 B1 | 8/2008 | Tong et al. | |
| 7,546,147 B2 | 6/2009 | Jitsuishi et al. | |
| 7,774,549 B2 | 8/2010 | Vishin | |
| 7,856,633 B1 | 12/2010 | Lee et al. | |
| 8,087,024 B2 | 12/2011 | Lakshmanamurthy et al. | |
| 8,176,282 B2 | 5/2012 | Bouvier | |
| 2002/0002657 A1 | 1/2002 | Sturges et al. | |
| 2003/0154345 A1 | 8/2003 | Lyon | |
| 2003/0196066 A1 * | 10/2003 | Mathews ....................... | 711/207 |
| 2005/0132364 A1 | 6/2005 | Tewari et al. | |
| 2005/0210108 A1 * | 9/2005 | Covert et al. .................. | 709/206 |
| 2006/0004963 A1 | 1/2006 | Mattina et al. | |
| 2006/0095680 A1 | 5/2006 | Park et al. | |

(Continued)

FOREIGN PATENT DOCUMENTS

WO    WO 2006/082554 A2    8/2006

OTHER PUBLICATIONS

International Search Report and Written Opinion dated Dec. 7, 2010 for International Application No. PCT/EP2010/062077, 9 pages.
USPTO U.S. Appl. No. 12/546,791, 1 page.

(Continued)

*Primary Examiner* — Reginald Bragdon
*Assistant Examiner* — Gurtej Bansal
(74) *Attorney, Agent, or Firm* — Stephen R. Tkacs; Stephen J. Walder, Jr.; Eustus O. Nelson (57) ABSTRACT

A mechanism is provided in a virtual machine monitor for fine grained cache allocation in a shared cache. The mechanism partitions a cache tag into a most significant bit (MSB) portion and a least significant bit (LSB) portion. The MSB portion of the tags is shared among the cache lines in a set. The LSB portion of the tags is private, one per cache line. The mechanism allows software to set the MSB portion of tags in a cache to allocate sets of cache lines. The cache controller determines whether a cache line is locked based on the MSB portion of the tag.

20 Claims, 4 Drawing Sheets

(56) References Cited

U.S. PATENT DOCUMENTS

| | | | |
|---|---|---|---|
| 2006/0136667 | A1 | 6/2006 | Shultz et al. |
| 2006/0143388 | A1 | 6/2006 | Wintergerst et al. |
| 2007/0005906 | A1* | 1/2007 | Miyamoto ............... 711/143 |
| 2007/0204121 | A1* | 8/2007 | O'Connor et al. ........ 711/163 |
| 2007/0214456 | A1* | 9/2007 | Casey et al. ............. 718/100 |
| 2007/0260819 | A1 | 11/2007 | Gao et al. |
| 2007/0266207 | A1 | 11/2007 | Moyer |
| 2008/0010413 | A1 | 1/2008 | Kailas et al. |
| 2008/0022040 | A1 | 1/2008 | Joukan et al. |
| 2008/0034162 | A1 | 2/2008 | Sturges et al. |
| 2008/0147990 | A1* | 6/2008 | Pesavento et al. ....... 711/145 |
| 2008/0148241 | A1 | 6/2008 | Jones et al. |
| 2008/0177974 | A1* | 7/2008 | Chiang et al. ............ 711/173 |
| 2008/0215824 | A1 | 9/2008 | Goodman et al. |
| 2008/0270705 | A1 | 10/2008 | Kailas et al. |
| 2008/0288942 | A1 | 11/2008 | Barsness et al. |
| 2009/0300631 | A1 | 12/2009 | Karlapalem et al. |
| 2010/0037097 | A1 | 2/2010 | Kobayashi et al. |
| 2010/0318742 | A1 | 12/2010 | Plondke et al. |
| 2011/0055827 | A1 | 3/2011 | Lin et al. |
| 2012/0198172 | A1 | 8/2012 | Lin et al. |

OTHER PUBLICATIONS

Kessler, R. E. et al., "Page Placement Algorithms for Large Real-Indexed Caches", ACM Transactions on Computer Systems, vol. 10, No. 4, Nov. 1992, pp. 338-359.

Lin, Jiang et al., "Cache Partitioning in Virtualized Environments", U.S. Appl. No. 12/546,791, filed Aug. 25, 2009.

Lin, Jiang et al., "Gaining Insights into Multicore Cache Partitioning: Bridging the Gap between Simulation and Real Systems", 14th International Symposium on High-Performance Computer Architecture (HPCA), 2008, pp. 367-378.

Nesbit, Kyle J. et al., "Virtual Private Caches", Proceedings of the 34th Annual International Symposium on Computer Architecture (ISCA'07), San Diego, California, Jun. 9-13, 2007, pp. 57-68.

Qureshi, Moinuddin K. et al., "Utility-Based Cache Partitioning: A Low-Overhead, High-Performance, Runtime Mechanism to Partition Shared Caches", Proceeding of the 39th Annual IEEE/ACM International Symposium on Microarchitecture, 2006, pp. 423-432.

Suh, G. E. et al., "Dynamic Cache Partitioning for Simultaneous Multithreading Systems", Proceedings of the IASTED International Conference on Parallel and Distributed Computing and Systems (PDCS'01), Anaheim, California, Aug. 2001, pp. 635-641.

Rothman, Jeffrey B. et al., "Sector Cache Design and Performance", Proceedings of MASCOTS 2000, Jan. 1999.

Office Action mailed May 22, 2012 for U.S. Appl. No. 12/546,791; 18 pages.

Preliminary Amendment filed Apr. 12, 2012 for U.S. Appl. No. 12/546,791; 7 pages.

USPTO U.S. Appl. No. 13/444,439, 1 page.

Final Office Action dated Jan. 4, 2013, for U.S. Appl. No. 13/444,439; 16 pages.

Final Office Action dated Nov. 6, 2012 for U.S. Appl. No. 12/546,791; 19 pages.

Interview Summary mailed Dec. 21, 2012 for U.S. Appl. No. 12/546,791; 3 pages.

Response to Final Office Action filed Jan. 16, 2013, U.S. Appl. No. 12/546,791, 12 pages.

Office Action mailed Jul. 30, 2012 for U.S. Appl. No. 13/444,439; 15 pages.

Response to Office Action filed Aug. 16, 2012, U.S. Appl. No. 12/546,791, 14 pages.

Response to Office Action filed Oct. 25, 2012, U.S. Appl. No. 13/444,439, 9 pages.

Response to Final Office Action filed Apr. 3, 2013, U.S. Appl. No. 13/444,439, 10 pages.

* cited by examiner

FINE GRAINED CACHE ALLOCATION

This invention was made with United States Government support under Agreement No. HR0011-07-9-0002 awarded by DARPA. The Government has certain rights in the invention.

BACKGROUND

The present application relates generally to an improved data processing apparatus and method and more specifically to an apparatus and method for fine grained cache allocation in a shared cache.

A cache is used to speed up data transfer and may be either temporary or permanent. Memory caches are in every computer to speed up instruction execution and data retrieval and updating. These temporary caches serve as staging areas, and their contents are constantly changing. A memory cache, or "CPU cache," is a memory bank that bridges main memory and the central processing unit (CPU). A memory cache is faster than main memory and allows instructions to be executed and data to be read and written at higher speed. Instructions and data are transferred from main memory to the cache in fixed blocks, known as cache "lines."

A virtual machine is an instance of an operating system along with one or more applications running in an isolated partition within a computer system. A virtual machine monitor enables different operating systems to run in the same computer at the same time and prevents applications from interfering with each other. This differs from a dual-boot or multi-boot environment, in which the user has to choose only one operating system at startup.

Each virtual machine is like a machine within the machine and functions as if it owns the entire computer. The operating systems in each virtual machine partition may be referred to as "guest operating systems," and they communicate with the hardware via the virtual machine monitor (VMM). The VMM "virtualizes" the hardware, such as processors, memory, input/output (I/O) adapters, and other resources, for each virtual machine.

Using virtualization, multiple operating systems can run in the same server, eliminating the need to dedicate a single machine to one application. Old and new applications can run simultaneously with their respective operating systems in multiple core servers with many threads of execution, saving space and power consumption. New versions of an operating system and new applications can be deployed without purchasing new hardware.

SUMMARY

In one illustrative embodiment, a method, in a data processing system, is provided for fine grained cache allocation of a shared cache. The method comprises receiving, by a cache controller, a tag portion from an application, setting the tag portion for a group of cache lines in a tag array of the shared cache, responsive to an attempt to overwrite a given cache line within the group of cache lines, determining whether the given cache line is locked based on the tag portion, and overwriting, by the cache controller, the given cache line if the cache line is not locked.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided for fine grained cache allocation of a shared cache. The apparatus comprises a cache array and a cache controller coupled to the cache array. The cache controller is configured to receive a tag portion from an application, set the tag portion for a group of cache lines of the cache array in a tag array, responsive to an attempt to overwrite a given cache line within the group of cache lines, determine whether the given cache line is locked based on the tag portion, and overwrite the given cache line if the cache line is not locked.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism in a virtual machine monitor for fine grained cache allocation in a shared cache. The mechanism partitions a cache tag into a most significant bit (MSB) portion and a least significant bit (LSB) portion. The MSB portion of the tags is shared among the cache lines in a set. The LSB portion of the tags is private, one per cache line. The mechanism allows software to set the MSB portion of tags in a cache to allocate sets of cache lines. Only a cache line with the specified MSB tag can be cached in the group, effectively allocating cache at a "group" granularity. The cache controller determines whether a cache line is locked based on the MSB portion of the tag.

In one exemplary embodiment, the cache controller may set a lock bit associated with each MSB tag. If software writes to the MSB tag, the cache controller sets the lock bit for that MSB tag. If a MSB is unlocked, then cache lines with that MSB tag are replaceable by hardware. If a MSB is locked, then cache lines with that MSB tag are not normally replaced by hardware, in which case, the cache controller must find another cache line to replace or simply not write the cache line to cache.

In one exemplary embodiment, software may add a mask to each MSB tag. A line at a real address (RA) is cacheable by hardware only if (RA & mask) does not match the MSB tag. Alternatively, the cache controller may overwrite the cache line only if (RA & mask) matches the MSB tag.

Figure 1:
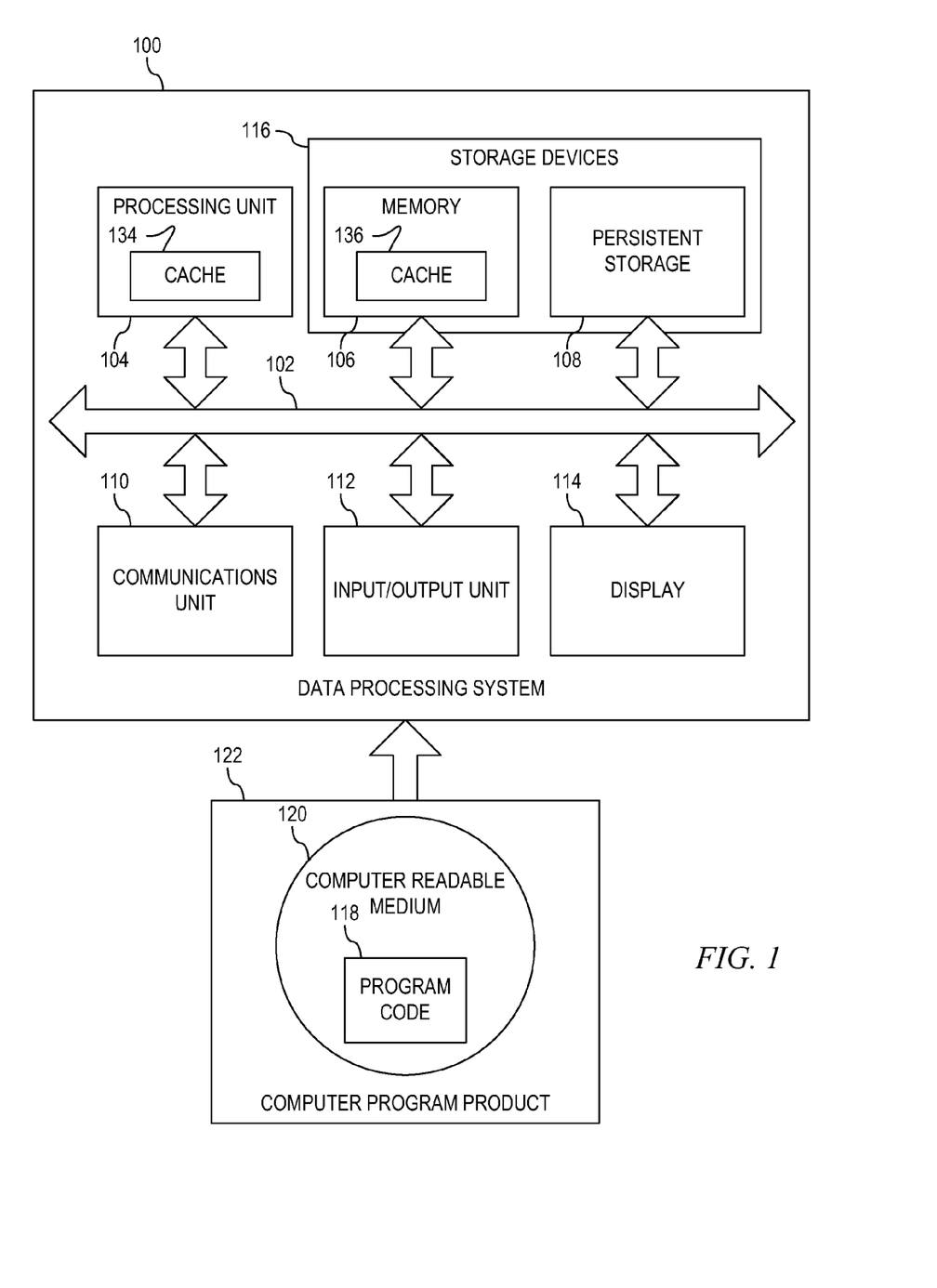
FIG. 1 is a block diagram of a data processing system in which aspects of the illustrative embodiments may be implemented.
Figure 2:
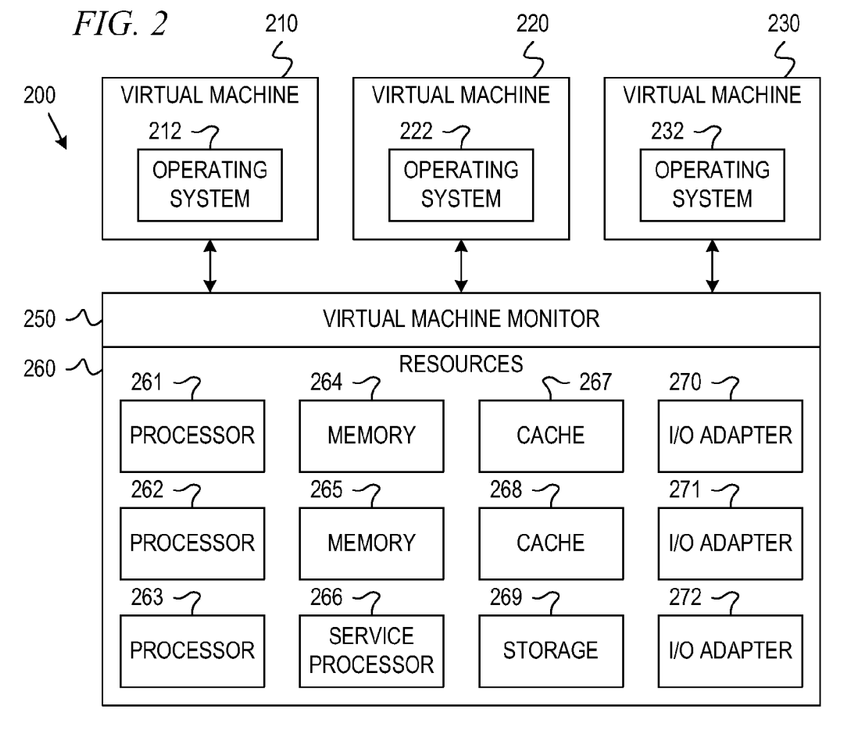
FIG. 2 is a block diagram of an example virtualized environment in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 is a block diagram of a data processing system in which aspects of the illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Processing unit 104 may have cache 134. Cache 134 may be a level 0 (L0) and/or level 1 (L1) cache. Memory 106 may have cache 136, which may be, for example, a level 2 (L2) cache or level 3 (L3) cache. Memory 106 may be a shared memory that is shared among a plurality of threads or a plurality of processing units. Therefore, cache 136 may be a shared cache.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable medium 120 that is selectively removable and may be loaded onto or transferred to data processing system 100 for execution by processor unit 104. Program code 118 and computer readable medium 120 form computer program product 122 in these examples. In one example, computer readable medium 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable medium 120 also may take the form of a persistent storage, such as a hard drive, a thumb drive, or a flash memory that is connected to data processing system 100. The tangible form of computer readable medium 120 is also referred to as a computer recordable storage medium. In some instances, computer readable medium 120 may not be removable.

Alternatively, program code 118 may be transferred to data processing system 100 from computer readable medium 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code.

As another example, a storage device in data processing system 100 is any hardware apparatus that may store data. Memory 106, persistent storage 108 and computer readable medium 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

FIG. 2 is a block diagram of an example virtualized environment in which aspects of the illustrative embodiments may be implemented. The hardware in virtualized environment 200 may be implemented as, for example, data processing system 100 in FIG. 1. Virtualized environment 200 includes virtual machines 210, 220, and 230, virtual machine monitor 250, and resources 260. Operating systems 212, 222, and 232 execute within virtual machines 210, 220, and 230, respectively. Operating systems 212, 222, and 232 may be multiple copies of a single operating system or multiple heterogeneous operating systems simultaneously run within virtualized environment 200.

Virtual machine monitor 250 allocates resources 260 to virtual machines 210, 220, and 230. Resources 260 may include, for example, processors 261-263, memory 264 and 265, service processor 266, cache 267 and 268, storage 269, and I/O adapters 270-272. For example, virtual machine monitor 250 may assign a "virtual processor" to each virtual machine, which appears as a single processor from the perspective of the virtual machine. A virtual processor may be a thread of a multi-threaded processor core, a processor core, a plurality of processor cores, a multiple core processor, or a plurality of processors.

Virtual machine monitor 250 performs a number of functions and services for virtual machines 210, 220, and 230 to create and enforce the partitioning of virtualized environment 200. Virtual machine monitor 250 may be software or firmware running on service processor 266, for example. Hypervisor software is an example of server firmware available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, virtual machine monitor 250 allows the simultaneous execution of independent operating system images 212, 222, and 232 by virtualizing all hardware resources of virtualized environment 200.

More particularly, resources 260 include cache 267 and cache 268. Therefore, cache 267 and cache 268 may be shared caches. Virtualized environments may require performance guarantees. For example, for a virtual machine to meet a performance target, the virtual machine may require a certain amount of cache. Therefore, the cache may be partitioned using cache coloring or way partitioning. However, interference in shared caches may be at odds with performance guarantees.

In accordance with an illustrative embodiment, a mechanism is provided in virtual machine monitor 250 and caches 267 and 268 for allowing software in virtual machines 210, 220, and 230 fine grained control of shared caches. The mechanism partitions a cache tag into a most significant bit (MSB) portion and a least significant bit (LSB) portion. The MSB portion of the tags are shared among the cache lines in a set. The LSB portion of the tags are private, one per cache line. The mechanism allows software in virtual machines 210, 220, and 230 to set the MSB portion of tags in a cache to allocate sets of cache lines. Only a cache line with the specified MSB tag can be cached in the group, effectively allocating cache at a "group" granularity. The cache controller determines whether a cache line is locked based on the MSB portion of the tag.

Figure 3:
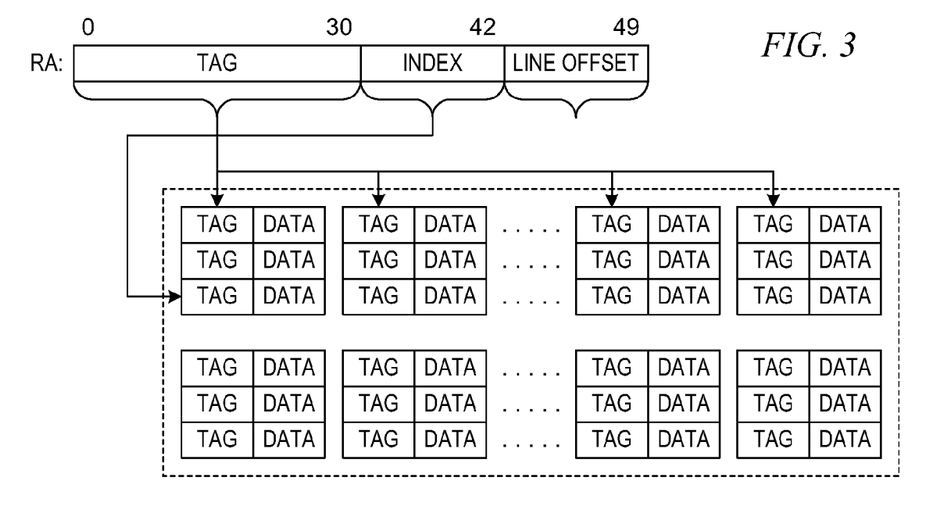
FIG. 3 depicts a real addresses and cache tag convention in which aspects of the illustrative embodiments may be implemented.

FIG. 3 depicts a real addresses and cache tag convention in which aspects of the illustrative embodiments may be implemented. In the example depicted in FIG. 3, consider a 50-bit real address (RA) for a 4 MB, 8-way associative cache with 128B cache lines. In this example, a real address comprises a 31-bit tag, a 12-bit index, and a 7-bit line offset. The index indicates a row, or set, in the cache. The cache controller then compares the tag of the real address to the tag of each cache line in that row to identify whether there is a cache hit or a cache miss. As depicted, each cache line has a full private tag.

Figure 4:
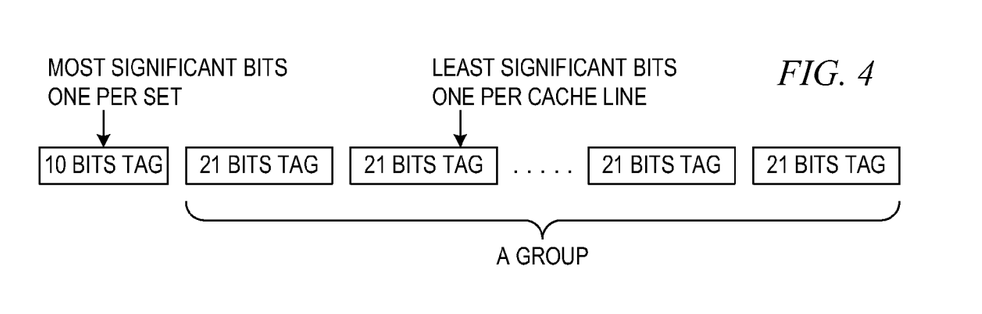
FIG. 4 depicts a split tag convention in accordance with an illustrative embodiment.

In accordance with an illustrative embodiment, the tag comprises two parts: a most significant bit (MSB) portion and a least significant bit (LSB) portion. FIG. 4 depicts a split tag convention in accordance with an illustrative embodiment. In the depicted example, each tag is divided into a 10-bit MSB portion and a 21-bit LSB portion. Each cache line has a private tag for the LSB portion of the tag. Multiple cache lines share one tag for the MSB portion of the tag. For example, there may be one MSB tag per set and one LSB tag per cache line (group).

Figure 5:
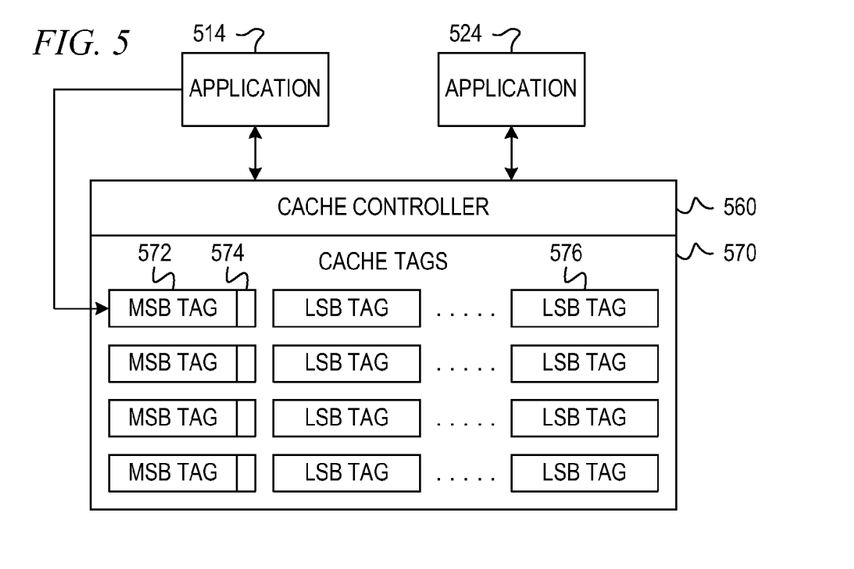
FIG. 5 is a block diagram illustrating fine grained cache allocation with tag locking in accordance with an illustrative embodiment.

FIG. 5 is a block diagram illustrating fine grained cache allocation with tag locking in accordance with an illustrative embodiment. Applications 514 and 524 may execute within the same operating system, in separate threads running on the same processor, in separate processors, in separate operating systems, or in separate operating systems within separate virtual machines, as described above with respect to FIG. 2. In the depicted example, applications 514 and 524 share the cache of cache controller 560.

Cache controller 560 manages tag array 570, which contains information about the cache lines stored in the cache array (not shown). Application 514 may set MSB tag 572, for example, to allocate cache lines in the cache array. Because all cache lines in the group, or set, share the same MSB tag, application 514 effectively allocates cache at a "group" granularity. Cache controller 560 sets lock bit 574 associated with MSB tag 572 responsive to application 514 setting MSB tag 572. If lock bit 574 is unlocked, then cache lines having MSB tag 572 are replaceable by cache controller 560. If lock bit 574 is locked, then cache lines having MSB tag 572 are not replaceable by cache controller 560. LSB tags 576 correspond to individual cache lines within the cache line group or set.

Figure 6:
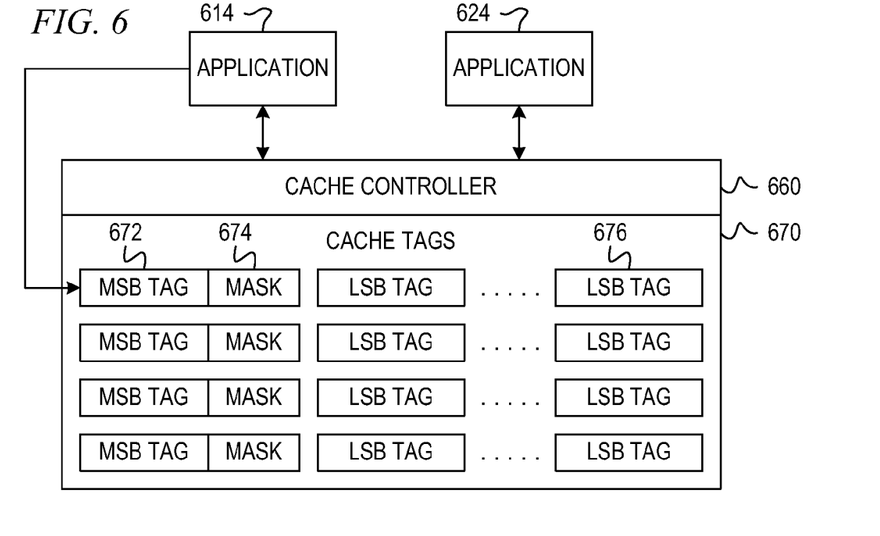
FIG. 6 is a block diagram illustrating fine grained cache allocation with masking in accordance with an illustrative embodiment.

FIG. 6 is a block diagram illustrating fine grained cache allocation with masking in accordance with an illustrative embodiment. Applications 614 and 624 may execute within the same operating system, in separate threads running on the same processor, in separate processors, in separate operating systems, or in separate operating systems within separate virtual machines, as described above with respect to FIG. 2. In the depicted example, applications 614 and 624 share the cache of cache controller 560.

Cache controller 660 manages tag array 670, which contain information about the cache lines stored in the cache array (not shown). Application 614 may set MSB tag 672, for example, to allocate cache lines in the cache array. Because all cache lines in the group, or set, share the same MSB tag, application 614 effectively allocates cache at a "group" granularity. In accordance with the illustrative embodiment, application 614 also sets mask 674 associated with MSB tag 672. For a given cache line, if the real address (RA) AND mask 674 is not equal to MSB tag 672, then cache lines having MSB tag 672 are replaceable by cache controller 660. Alternatively, a given cache line may be replaceable by cache controller 660 only if the real address (RA) AND mask 674 is equal to MSB tag 672. LSB tags 676 correspond to individual caches lines in the cache line group or set.

In an alternative embodiment, cache controller 560 in FIG. 5 and cache controller 660 in FIG. 6 may consider the software set tags as hints. For example, the cache controller may replace a cache line having a software-set MSB tag in extreme cases, such as when a cache line could not go to any other place in the cache.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the user's computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
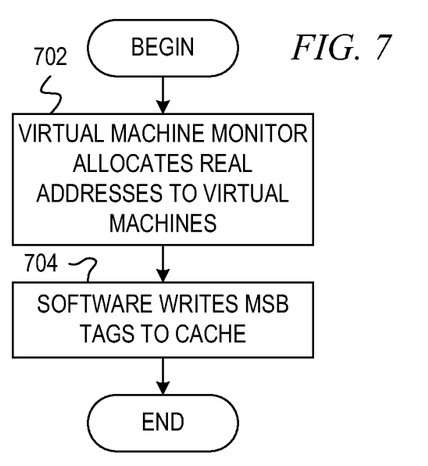
FIG. 7 is a flowchart illustrating operation of a virtual machine monitor for fine grained cache allocation in a virtualized environment in accordance with an illustrative embodiment.

FIG. 7 is a flowchart illustrating operation of a virtual machine monitor for fine grained cache allocation in a virtualized environment in accordance with an illustrative embodiment. Operation begins, and the virtual machine monitor allocates real addresses to the virtual machines (block 702). Software running within the virtual machines then sets most significant bit (MSB) tags to the tag array within the cache (block 704). Thereafter, operation ends.

Figure 8:
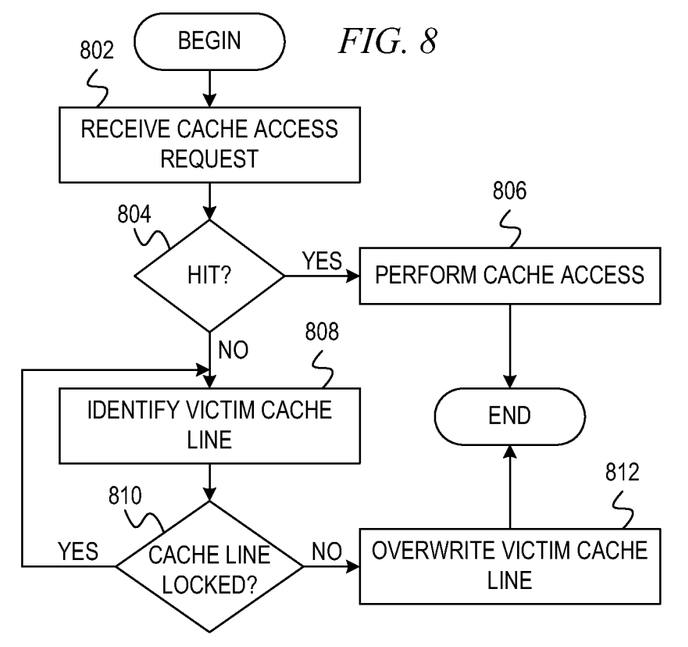
FIG. 8 is a flowchart illustrating operation of a cache controller for a shared cache in accordance with an illustrative embodiment.

FIG. 8 is a flowchart illustrating operation of a cache controller for a shared cache in accordance with an illustrative embodiment. Operation begins, and the cache controller receives a cache access request (block 802). The cache controller determines whether the cache access request results in a cache hit (block 804). If the cache access request results in a hit, then the cache controller performs the cache access (block 806), and operation ends.

If the cache access request results in a cache miss in block 804, then the cache controller identifies a victim cache line (block 808). The cache controller determines whether the victim cache line is locked (block 810). The cache controller may determine whether the victim cache line is locked by examining a lock bit associated with a MSB tag of the victim cache line. Alternatively, the cache controller may determine whether the victim cache line is locked by applying a mask to the real address of the victim cache line and comparing the result to the MSB tag. If the victim cache line is locked in block 810, operation returns to block 808 to identify another victim cache line. If the victim cache line is unlocked in block 810, then the cache controller overwrites the victim cache line (block 812), and operation ends.

Thus, the illustrative embodiments provide mechanisms in a virtual machine monitor for fine grained cache allocation in a shared cache. The mechanism partitions a cache tag into a most significant bit (MSB) portion and a least significant bit (LSB) portion. The MSB portion of the tags is shared among the cache lines in a set. The LSB portion of the tags is private, one per cache line. The mechanism allows software to set the MSB portion of tags in a cache to allocate sets of cache lines. Only a cache line with the specified MSB tag can be cached in the group, effectively allocating cache at a "group" granularity. The cache controller determines whether a cache line is locked based on the MSB portion of the tag.

In one exemplary embodiment, the cache controller may set a lock bit associated with each MSB tag. If software writes to the MSB tag, the cache controller sets the lock bit for that MSB tag. If a MSB is unlocked, then cache lines with that MSB tag are replaceable by hardware. If a MSB is locked, then cache lines with that MSB tag are not replaceable by hardware, in which case, the cache controller must find another cache line to replace or simply not write the cache line to cache.

In one exemplary embodiment, software may add a mask to each MSB tag. A line at a real address (RA) is cacheable by hardware only if (RA & mask) does not equal the MSB tag. Alternatively, the cache controller may overwrite the cache line only if (RA & mask) equals the MSB tag.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for fine grained cache allocation of a shared cache, the method comprising:
    receiving, by a cache controller, a tag portion from an application, within a plurality of applications, to allocate a group of cache lines in a shared cache to the application, wherein each cache line within the shared cache has a tag having a most significant bit portion and a least significant hit portion, wherein the shared cache is shared between the plurality of applications, wherein the most significant bit portion of the tag comprises a group tag for each group of cache lines, wherein the least significant bit portion of the tag comprises a private tag for each respective cache line, wherein only cache lines with the most significant bit portion of the tag can be cached in the group of cache lines;

allocating the group of cache lines to the application by setting the most significant hit tag portion to the tag portion horn the application for the group of cache lines in a tag array of the shared cache;

responsive to an attempt to overwrite a given cache line within the group of cache lines, determining whether the given cache line is locked to the application based on the most significant bit tag portion of the given cache line; and overwriting, by the cache controller, the given cache line if the cache line is not locked, wherein overwriting the given cache line comprises overwriting a most significant bit portion of a tag of the given cache line.

2. The method of claim 1, wherein determining whether the given cache line is locked comprises:
determining whether a lock bit associated with the most significant bit tag portion associated with the given cache line is set.

3. The method of claim 1, further comprising:
receiving, by the cache controller, a mask from the application; and
storing the mask in association with the most significant bit tag portion or the group of cache lines.

4. The method of claim 3, wherein determining whether the given cache line is locked comprises:
applying the mask to a real address associated with the given cache line to generate a masked real address; and
determining whether the masked real address is equal to the most significant bit tag portion associated with the given cache line.

5. The method of claim 1, wherein a virtual machine monitor allocates a set of real addresses to a given virtual machine.

6. The method of claim 5, wherein the application executes within the given virtual machine and writes the tag portion to the tag array of the shared cache.

7. An apparatus, in a data processing system, for fine grained cache allocation of a shared cache, the apparatus comprising:
a cache array; and
a cache controller coupled the cache array, wherein the cache controller is configured to:
receive a tag portion from an application, within a plurality of applications, to allocate a group of cache lines in a shared cache to the application, wherein each cache line within the shared cache has a tag having a most significant bit portion and a least significant bit portion, wherein the shared cache is shared between the plurality of applications, wherein the most significant bit portion of the tag comprises a group tag for each group of cache lines, wherein the least significant bit portion of the tag comprises a private tag for each respective cache line, and wherein only cache lines with the most significant bit portion of the tag can be cached in the group of cache lines;
allocating the group of cache lines to the application by setting the most significant bit tag portion to the tag portion from the application for the group of cache lines of the cache array in a tag array;
responsive to an attempt to overwrite a given cache line within the group of cache lines, determine whether the given cache line is locked to the application based on the most significant bit tag portion of the given cache line; and overwrite the given cache line if the cache line is not locked, wherein overwriting the given cache line comprises overwriting a most significant bit portion of a tag of the given cache line.

8. The apparatus of claim 7, wherein determining whether the given cache line is locked comprises:
determining whether a lock bit associated with the most significant bit tag portion associated with the given cache line is set.

9. The apparatus of claim 7, wherein the cache controller is further configured to:
receive a mask from the application; and
store the mask in association with the most significant bit tag portion for the group of cache lines.

10. The apparatus of claim 9, wherein determining whether the given cache line is locked comprises:
applying the mask to a real address associated with the given cache line to generate a masked real address; and
determining whether the masked real address is equal to the most significant bit tag portion associated with the given cache line.

11. The apparatus of claim 7, wherein a virtual machine monitor allocates a set of real addresses to a given virtual machine.

12. The apparatus of claim 11, wherein the application executes within the given virtual machine and write the tag portion to the tag array of the shared cache.

13. A computer program product comprising a non-transitory computer readable medium having a computer readable program, wherein the computer readable program, when executed on a computing device, causes the computing device to:
receive a tag portion from an application, within a plurality of applications, to allocate a group of cache lines in a shared cache to the application, wherein each cache line within the shared cache has a tag having a most significant hit portion and a least significant hit portion, wherein the shared cache is shared between the plurality of applications, wherein the most significant hit portion of the tag comprises a group tag for each group of cache lines, wherein the least significant bit portion of the tag comprises a private tag for each respective cache line, and wherein only cache lines with the most significant bit portion of the tag can be cached in the group of cache lines;
allocating the group of cache lines to the application by setting the most significant bit tag portion to the tag portion from the application for the group of cache lines of the cache array in a tag array;
responsive to an attempt to overwrite a given cache line within the group of cache lines, determine whether the given cache line is locked to the application based on the most significant bit tag portion of the given cache line; and
overwrite the given cache line if the cache line is not locked, wherein overwriting the given cache line comprises overwriting a most significant bit portion of a tag of the given cache line.

14. The computer program product of claim 13, wherein determining whether the given cache line is locked comprises:
determining whether a lock bit associated with the most significant bit tag portion associated with the given cache line is set.

15. The computer program product of claim 13, wherein the computer readable program further causes the computing device to:

receive a mask from the application; and store the mask in association with the most significant bit tag portion for the group of cache lines.

16. The computer program product of claim 15, wherein determining whether the given cache line is locked comprises:

applying the mask to a real address associated with the given cache line to generate a masked real address; and determining whether the masked real address is equal to the most significant hit tag portion associated with the given cache line.

17. The computer program product of claim 13, wherein the computer readable program is stored in a computer readable storage medium in a data processing system and wherein the computer readable program was downloaded over a network from a remote data processing system.

18. The computer program product of claim 13, wherein the computer readable program is stored in a computer readable storage medium in a server data processing system and wherein the computer readable program is downloaded over a network to a remote data processing system for use in a computer readable storage medium with the remote system.

19. The computer program product of claim 13, wherein a virtual machine monitor allocates a set of real addresses to a given virtual machine.

20. The computer program product of claim 19, wherein the application executes within the given virtual machine and writes the tag portion to the tag array of the shared cache.

* * * * *